(12) United States Patent
Kogure et al.

(10) Patent No.: US 9,197,105 B2
(45) Date of Patent: Nov. 24, 2015

(54) IPM MOTOR ROTOR AND PRODUCTION METHOD THEREFOR

(75) Inventors: Tomonari Kogure, Anjyo (JP); Kazuaki Haga, Toyota (JP); Hiroko Kurihara, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 820 days.

(21) Appl. No.: 13/338,743

(22) Filed: Dec. 28, 2011

(65) Prior Publication Data

US 2012/0153765 A1 Jun. 21, 2012

(30) Foreign Application Priority Data

Jan. 18, 2010 (JP) .................................. 2010-008261

(51) Int. Cl.
*H02K 1/27* (2006.01)
*H02K 15/03* (2006.01)

(52) U.S. Cl.
CPC .............. *H02K 1/2766* (2013.01); *H02K 1/276* (2013.01); *H02K 15/03* (2013.01); *Y10T 29/49012* (2015.01)

(58) Field of Classification Search
CPC .............................. H02K 1/2766; H02K 1/276

USPC ............. 310/156.38, 156.43, 156.45, 156.46, 310/156.53, 156.56
See application file for complete search history.

(56) References Cited

U.S. PATENT DOCUMENTS

2009/0322175 A1* 12/2009 Kori et al. ................ 310/156.41
2010/0244608 A1* 9/2010 Nakamura et al. ........ 310/156.38

FOREIGN PATENT DOCUMENTS

| JP | 2000-245085 A | 9/2000 |
|----|---------------|--------|
| JP | 2003-032926 A | 1/2003 |
| JP | 2003-134750 A | 5/2003 |
| JP | 2005-057958 A | 3/2005 |
| JP | 2008-043124 A | 2/2008 |
| JP | 2009-142081 A | 6/2009 |
| JP | 2009-219314 A | 9/2009 |
| JP | 4497198 B2    | 4/2010 |

OTHER PUBLICATIONS

Japanese Office Action for corresponding JP Patent Application No. 2010-008261 issued on May 8, 2012.

* cited by examiner

*Primary Examiner* — Dang Le
(74) *Attorney, Agent, or Firm* — Sughrue Mion, PLLC

(57) ABSTRACT

In an IPM motor rotor, a rotor core has a plurality of magnetic poles, and each magnetic pole is formed by two permanent magnets. The two permanent magnets of each magnetic pole are two split pieces obtained by splitting one parent permanent magnet that is larger than the permanent magnets.

4 Claims, 4 Drawing Sheets

IPM MOTOR ROTOR AND PRODUCTION METHOD THEREFOR

INCORPORATION BY REFERENCE

The disclosure of Japanese Patent Application No. 2010-008261 filed on Jan. 18, 2010 including the specification, drawings and abstract is incorporated herein by reference in its entirety.

BACKGROUND OF THE INVENTION

1. Field of the Invention

The invention relates to a rotor for an electric motor (interior permanent magnet (IPM) motor) which includes permanent magnets inserted within slots that are formed in a rotor core, and to a production method for the rotor.

2. Description of Related Art

Among various electric motors, such as brushless DC motors, there is a widely known motor that has an embedded-permanent magnet type rotor in which a plurality of permanent magnets are embedded within a rotor core (hereinafter, referred to as "IPM motor"). The IPM motors are used as, for example, motors for hybrid vehicles.

In electric motor manufacturers that manufacture IPM motors (including motor vehicle manufactures), permanent magnets to be embedded in rotors are obtained from magnet manufactures, and are inserted and fixed in magnet slots that are formed in rotor cores to manufacture rotors.

The permanent magnets obtained from a magnet manufacturer have product errors (product tolerances) as a matter of course. This will be explained simply on a weight basis. There are cases where, for permanent magnets of a weight of X (g), a product error (weight error) of, for example, ±0.01X (g), exists.

Manners of arrangement of permanent magnets in a rotor core vary; for example, there are a configuration in which one magnetic pole is formed by one permanent magnet, or a configuration as disclosed in Japanese Patent Application Publication No. 2005-57958 (JP-A-2005-57958) in which one magnetic pole is formed by disposing two permanent magnets in, for example, a V shape in a plan view. Regarding the permanent magnet configuration of the aforementioned V arrangement, which, with the flow of magnetic fluxes from the stator side to the rotor side taken into account, is able to achieve greater efficiency and higher reluctance torque, if the two permanent magnets of each magnetic pole have individual product errors as mentioned above, the product error per magnetic pole is twice the product error of one permanent magnet (in the foregoing example, the product error (weight error) per magnetic pole is ±0.02X (g)).

Besides, the aforementioned doubled product error brings about weight imbalance of the rotor, and this imbalance has been found to lead directly to variation and reduction of the motor torque, by the inventors. Generally, a rotor is equipped with a drive shaft attached to a center opening of the rotor, and the drive shaft is rotatably retained by bearing gears outside the motor.

Let us take as an example an IPM motor rotor in which eight magnetic poles each of which is formed by two permanent magnets arranged in a V shape (hence, 16 permanent magnets in total) are formed in the circumferential direction of the rotor core. This rotor can have a weight error as great as ±0.16X (g), which is a total weight error of the permanent magnets. The weight errors of the permanent magnets of the individual magnetic poles can give an excessive eccentric load to the bearing gears that rotatably retain the drive shaft, and therefore can reduce the durability of the gear. Or, the weight errors of the permanent magnets result in different centrifugal forces acting on the individual magnetic poles when the rotor rotates, which can cause vibration or noise to be produced between the rotor and the drive shaft. In a more detailed discussion on the centrifugal force, since the centrifugal force depends on both the weight of the permanent magnets and the distance from the rotor center to the position at which the permanent magnets are disposed, it is naturally necessary to secure fine control not only on the weight of the permanent magnets but also over the process of defining the positions of the slots for the permanent magnets.

Therefore, in an actual electric motor manufacturer, an adjustment process is sometimes performed in which when the two opposite end portions of the rotor core are capped with end plates after a predetermined number of permanent magnets are inserted and fixed within the rotor core, the weight imbalance of the permanent magnets of each magnetic pole is lessened in the entire rotor by, for example, forming reduced-wall thickness portions at suitable locations on the end plates, so as to adjust the weight imbalance of the permanent magnets of each magnetic pole.

However, it is easily understandable that such a weight adjustment requires a large number of workers and a large amount of time. The problem of an increased manufacture time resulting from the weight adjustment needs to be promptly solved, for example, in the case where the rotors produced are applied to drive motors of hybrid vehicles, whose production is recently becoming larger and larger.

SUMMARY OF THE INVENTION

The invention provides an IPM motor rotor and a production method for the rotor that minimize the weight errors of the permanent magnets of each magnetic pole of the rotor and will not give rise to problems that can be assumed to arise in conjunction with the mechanical cutting of permanent magnets.

An IPM motor rotor according to a first aspect of the invention includes a rotor core that includes a plurality of magnetic poles each of which has at least two permanent magnets, wherein the at least two permanent magnets provided in each magnetic pole are formed by split pieces obtained by splitting one parent permanent magnet that is larger than the permanent magnets.

The permanent magnets that constitute a magnetic pole are arranged in, for example, a V shape within the rotor core, and a plurality of such magnetic poles are formed in the rotor core along the circumferential direction of the rotor core. Thus, the IPM motor rotor of the invention is constructed.

For example, two permanent magnets that constitute each magnetic pole are formed of split pieces obtained by splitting a parent permanent magnet that is about twice as large as each permanent magnet.

When a permanent magnet is split, there is a case where the magnet is split into two or more pieces, and the pieces are put back into the original shape of the permanent magnet by fitting the split surfaces together, and then the restored permanent magnet is used as a split magnet that is to be inserted into a magnet slot. In the rotor of the invention, however, this splitting technique is used to form from a parent permanent magnet two permanent magnets (split pieces) that constitute a magnetic pole.

In the case where the product error (weight error) of a relatively large parent permanent magnet is ±0.01X (g), if this magnet is split into two split pieces and the split pieces are used for one magnetic pole, the error of the magnet weight of this magnetic pole remains ±0.01X (g), and does not become ±0.02X (g), that is, a total of the weight errors of two separate permanent magnets in the case where two separate permanent magnets are used for one magnetic pole.

That is, splitting a relatively larger parent permanent magnet reduces the magnet weight error when viewed in terms of each magnetic pole. This reduces the imbalance of the rotor resulting from the weight error of the permanent magnets of each magnetic pole, leading to resolution of the problem of vibration and noise at the time of rotation of the rotor and further to improvement of the torque performance of the motor.

Besides, from the viewpoint of the production cost, in the case of a rotor having a configuration in which each magnetic pole is formed by two permanent magnets, if the acquisition cost of a permanent magnet is assumed to be Y, the acquisition cost of the permanent magnets per magnetic pole is 2Y.

On the other hand, in the case where a parent permanent magnet whose size is twice the size of a permanent magnet inserted into a magnet slot is acquired, the acquisition cost of the double-size permanent magnet generally cannot be 2Y, but normally is, for example, 1.5Y, 1.8Y or the like, according to a common sense in the distribution industry. Therefore, if an electric motor manufacturer acquires such large-size parent permanent magnets, and divides each large-size magnet into two permanent magnets, and uses the two permanent magnets for one magnetic pole, the cost of the purchase from a magnet maker is reduced, leading to a reduced production cost of IPM motor rotors and to a reduced production cost of IPM motors.

Incidentally, with regard to the rotor whose magnetic poles are each formed by two permanent magnets, it is conceivable to adopt a measure of purchasing relatively large parent permanent magnets, and mechanically cutting the parent permanent magnets into divided pieces by a cutter or the like at the side of an electric motor manufacturer, and then inserting and fixing the divided pieces in the two slots of each magnetic pole.

However, in the case where a permanent magnet is mechanically cut, it is understood that, due to the cutting, the permanent magnet loses a certain amount of magnet due to scraping corresponding to the thickness of the cutting blade because the cutting blade has a specific thickness or width, which changes in accordance with the frequency of use. Considering this, if two divided pieces are produced from one permanent magnet by mechanical cutting, the divided pieces can have product errors that correspond to the thickness of the cutting blade and to the errors of the blade. Therefore, from the viewpoint of the product error (weight error) of magnets, the mechanical cutting cannot be expected to achieve a considerable improvement over the case where two permanent magnets for each magnetic pole are purchased as separate magnets, and moreover, there is a significant possibility that the product error may increase.

Another problem regarding the mechanical cutting is that there is high possibility of reducing the residual magnetic flux density and the coercive force of the magnet itself. Rare-earth magnets, such as a neodymium magnet and the like, and ferrite magnets, which are permanent magnets, have a metallic structure that is formed by main phases S that contribute to magnetization and grain boundary phases R that contribute to coercive force as shown by an enlarged view in FIG. 6. If the permanent magnet is divided by mechanical cutting, the divided pieces are formed along a cut line shown by a line L1 in FIG. 6. As is apparent from FIG. 6, the line L1 (cut line) is formed as main phases S are cut and divided. The thus-cut main phases S are smaller in size than before they are cut, which is a cause of decreasing the residual magnetic flux density, Br, from the level prior to the cutting. Furthermore, the grain boundary phases R show coercive force to the main phases S that the grain boundary phases coat. However, the main phases S adjacent to the cut surface have lost the coating of grain boundary phases R, and easily reverse in magnetization if such an external magnetic field exists. If that happens, the coercive force of the entire magnet decreases, starting at the magnetization-reversed phases.

However, in the invention, since the large-size parent permanent magnet is not mechanically cut, the problem of weight error of the magnet caused by the cutting tool cannot occur.

Furthermore, since the large-size parent permanent magnet is split, main phases that constitute the metallic structure of the magnet are not cut on the split surfaces of the split pieces, and the split surfaces are formed by grain boundary phases that cover main phases. Therefore, the permanent magnets formed by the split pieces are excellent in both the magnetization performance (residual magnetic flux density) and the coercive force performance.

It is to be noted herein that the magnets (permanent magnets) used for the rotor of the invention encompass rare-earth magnets, ferrite magnets, alnico magnets, etc., and are not particularly limited as long as the magnets have a metallic structure that is made up of main phases that contribute to magnetization and grain boundary phases that contribute to coercive force. Besides, the "permanent magnet" mentioned herein is meant to not only include the aforementioned rare-earth magnets and the like that have been magnetized but also include sintered bodies that have not been magnetized as well as simple powder compacts. Examples of the rare-earth magnets include a neodymium magnet of a three-component system in which iron and boron are added to neodymium, a samarium cobalt magnet made of an alloy of a two-component system containing samarium and cobalt, a samarium iron nitrogen magnet, a praseodymium magnet, etc. The rare-earth magnets are higher in the maximum energy product product $(BH)_{max}$ than the ferrite magnets and the alnico magnets, and therefore are suitable to be applied to drive motors of hybrid vehicles and the like which are required to produce high outputs.

A production method for an IPM motor rotor in accordance with the invention is a production method for an IPM motor rotor, in which a plurality of magnetic poles are formed in a rotor core and each magnetic pole has at least two permanent magnets, the production method including: forming split pieces by splitting one parent permanent magnet that is larger than the permanent magnets; and inserting and fixing the split pieces respectively in magnet slots that are formed in the rotor core and that constitute a magnetic pole.

By employing the production method of the invention, the above-described IPM motor rotor of the invention can be obtained. Therefore, application of this production method reduces the purchase cost of the permanent magnets, and therefore reduces the production costs of rotors and electric motors. Furthermore, the rotor imbalance is conspicuously reduced in comparison with the case of the rotor having a related-art structure, and the decline of durability of the bearing gears that rotatably retain the drive shaft of the motor is restrained, and the vibration and noise between the rotor and the drive shaft are considerably reduced. Thus, an IPM motor rotor excellent in torque performance can be produced.

Since the imbalance of the rotor resulting from the weight error of the permanent magnets is reduced or resolved, it becomes possible to abolish the step of adjusting the weight imbalance of the permanent magnets of each magnetic pole, more specifically, an adjusting step in which when the two opposite end portions of the rotor core are capped with end plates, the weight imbalance of the permanent magnets of each magnetic pole is lessened in the entire rotor by, for example, forming reduced-wall thickness portions at suitable locations on the end plates, so as to adjust the weight imbalance of the permanent magnets of each magnetic pole, and therefore the need for a large amount of time and a large number of workers for the adjustment can be eliminated.

The above-described IPM motor rotor of the invention and the IPM motor rotor produced by the production method of the invention are suitable for drive motors of hybrid motor vehicles and electric motor vehicles which are increasingly mass-produced recently and are expected to have high output performances, and an important issue about which is reduction of the production cost.

As can be understood from the foregoing description, according to the IPM motor rotor of the invention, since split pieces obtained beforehand by splitting a large-size parent permanent magnet are used as two permanent magnets that constitute each magnetic pole, it is possible to realize all of the followings: reduction of the production costs of rotors and motors; reduction of the rotor imbalance resulting from the weight error of the permanent magnets of each magnetic pole; improvement of the torque performance of the motor based on the reduction of the rotor imbalance; and resolution of the problem of vibration and noise during the driving of the motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
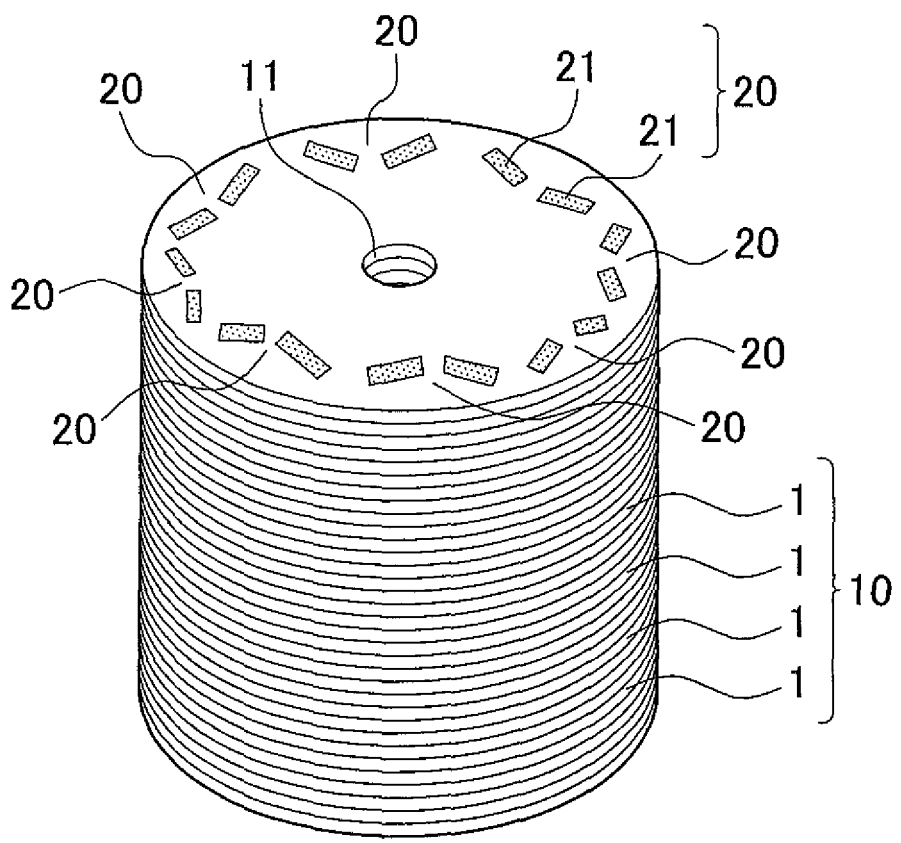
FIG. 1 is a perspective view of an IPM motor rotor in accordance with the invention.

Embodiments of the invention will be described hereinafter with reference to the accompanying drawings. It is to be naturally understood that although in the examples illustrated in the drawings, a rotor core has eight magnetic poles, the number of magnetic poles set in the rotor core is not limited to the illustrated examples. Besides, the end plates that cap the two opposite end portions of the rotor core are omitted from illustration in the drawings.

FIG. 1 shows an embodiment of the IPM motor rotor of the invention in a perspective view. A rotor 10 for an IPM motor shown in FIG. 1 is formed by stacking disc-shaped magnetic steel sheets 1, . . . , and fixing these sheets by swaging or the like. At a center position of the IPM motor rotor 10, a drive shaft hole 11 is formed. In a circumferential portion around the hole 11, two permanent magnets 21 and 21 for each magnetic pole 20 are inserted in their respective magnet slots that extend along the drive shaft hole 11. For example, the fixation of the permanent magnets 21 and 21 in the slots in each magnetic pole is secured by charging a fixing resin into spaces between the permanent magnets 21 and the slots. Eight of such magnetic poles are formed in the circumferential direction of the rotor core.

The two permanent magnets 21 and 21 of each magnetic pole 20 are arranged in a V shape in a plan view. Although not shown in the drawings, a stator has a yoke of a generally annular shape in a plan view, and teeth that are protruded radially inward from the yoke, and is formed by stacking a plurality of magnetic steel sheets. The rotor 10 shown in FIG. 1 is disposed at an inward side of the stator. A drive shaft (not shown) is inserted and fixed in the drive shaft hole 11 that is formed in the rotor 10. This drive shaft is freely rotatably retained by, for example, two bearing gears, outside the rotor 10. The IPM motor is constructed in this manner.

Incidentally, both the rotor 10 and the stator (not shown) are not limited to configurations formed by stacking magnetic steel sheets, but each may also be formed in the form of a dust core made of a soft magnetic metal powder of iron, iron-silicon-based alloy, iron-nitrogen-based alloy, iron-nickel-based alloy, iron-carbon-based alloy, iron-boron-based alloy, iron-cobalt-based alloy, iron-phosphorus-based alloy, iron-nickel-cobalt-based alloy, iron-aluminum-silicon-based alloy, etc., or a magnetic powder in which a soft magnetic metal oxide powder is coated with a resin binder such as a silicone resin or the like.

Figure 2A:
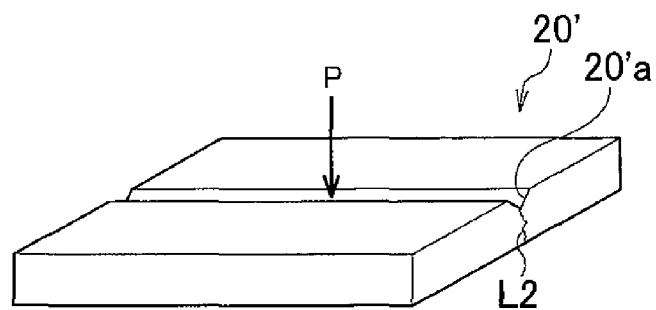
FIG. 2A is a diagram illustrating a part of a production method in accordance with the invention.

The permanent magnets 21 and 21 of each magnetic pole 20 which are inserted and fixed in the magnet slots formed in the rotor core are, as shown in FIG. 2A, magnets formed by split pieces obtained by splitting one parent permanent magnet that is larger than the permanent magnets 21, more specifically, a magnetic pole magnet-forming parent permanent magnet 20' whose size is twice the size of the permanent magnets 21.

For this splitting, it is desirable that, for example, as shown in FIG. 2A, a cut 20a' be formed beforehand on a side surface of a permanent magnet 20' so as to serve as split starting points, from the viewpoint of the accuracy and efficiency in the splitting.

The large-dimension parent permanent magnets 20' for forming magnetic pole magnets are purchased from a magnet maker, and therefore naturally have product errors and, more specifically, weight errors. However, from the viewpoint of each magnetic pole, since the two permanent magnets 21 and 21 that constitute a magnetic pole 20 are obtained by splitting one parent permanent magnet 20' acquired for forming magnetic pole magnets, the weight error possessed by the two permanent magnets 21 and 21 of each magnetic pole that are split pieces from one parent permanent magnet 20' is equal to the weight error possessed by the permanent magnet 20'. This means that from the viewpoint of each magnetic pole, the weight error in the unit of a magnetic pole is half the weight error per magnetic pole that occurs in the case where the permanent magnets 21 and 21 are purchased as separate magnets from a magnet maker, in which case the weight error of the two permanent magnets of each magnetic pole is twice the weight error of a permanent magnet.

Furthermore, purchasing and splitting the large-dimension parent permanent magnets 20' for forming magnetic pole magnets is naturally lower in purchase cost than purchasing two separate permanent magnets 21 and 21. This leads to a reduced production cost of the rotors and therefore to a reduced production cost of the IPM motors.

In particular, the permanent magnets that are embedded in a rotor that constitutes a drive motor for a hybrid vehicle, an electric motor vehicle, etc., contain large amounts of rare metals, such as dysprosium, terbium, etc., and therefore the purchase unit costs of these permanent magnets are very high. Considering this and the recent increased production of rotors due to rapid growth of the demand for hybrid vehicles and the like, the effect of reducing the purchase cost of the permanent magnets contributes very greatly to electric motor manufactures including motor vehicle manufacturers.

Besides, the reduction of the weight error of the permanent magnets per magnetic pole resolves the imbalance of the rotor that is attributed to the weight of the permanent magnets of each magnetic pole, and therefore resolves the problem of vibration and noise between the rotor and the drive shaft and the problem of decline of the durability of the bearing gears that rotatably retain the drive shaft, which are attributed to the imbalance of the rotor.

Figure 2B:
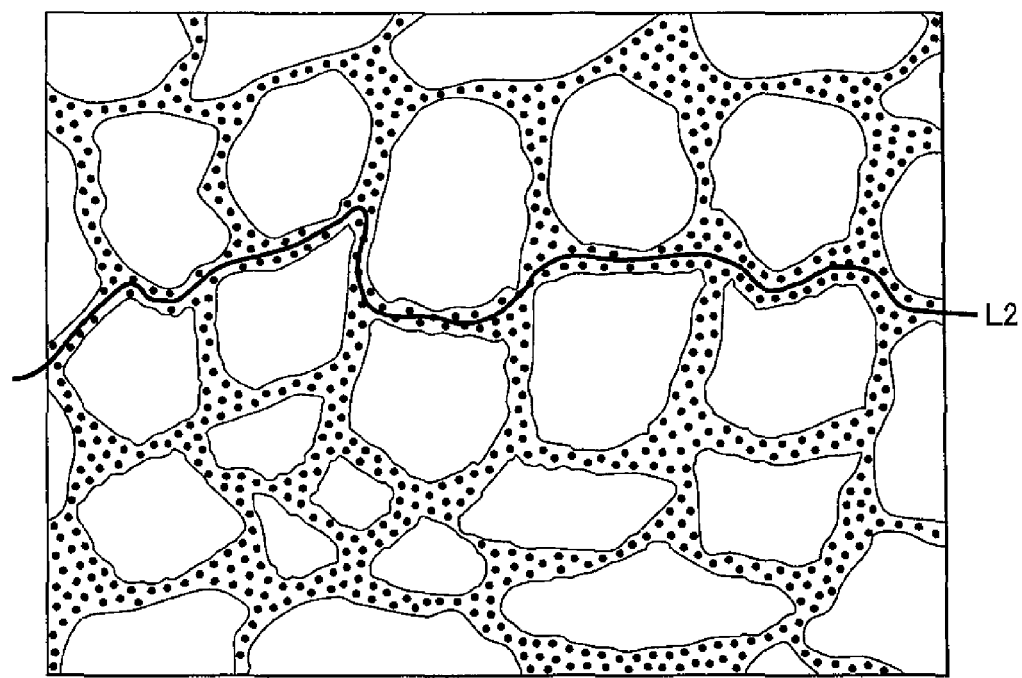
FIG. 2B is a diagram illustrating a magnet structure and a split surface line.
Figure 6:
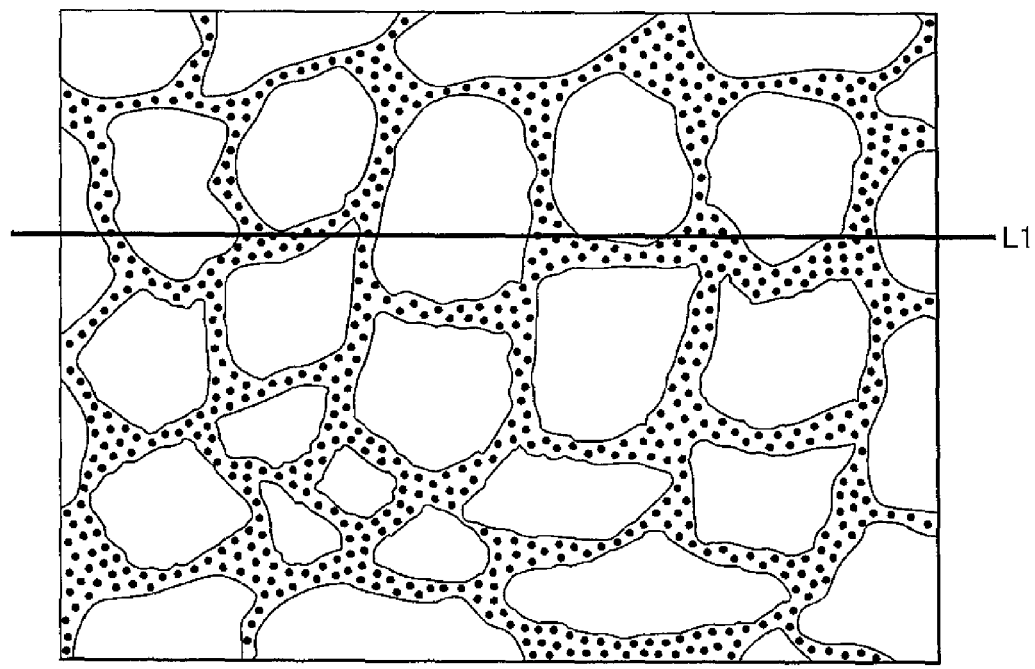
FIG. 6 is a diagram illustrating a division line in the structure of a permanent magnet in the case where the magnet is mechanically divided according to the related art.

FIG. 2B is a diagram illustrating a split line in the case where a permanent magnet is split, and also showing an internal structure of the permanent magnet. When the permanent magnet is split, the splitting occurs along a split line L2 as shown in FIG. 2B, so that split pieces are formed. It is to be noted herein that the metallic structure of the permanent magnet is formed by main phases S that contribute to magnetization and grain boundary phases R that contribute to the coercive force and that intervene among the main phases S. If a permanent magnet is mechanically cut as in the related art, a cut line L1 that divides main phases S as shown in FIG. 6 is obtained. On the other hand, if a permanent magnet is split, a split line L2 is formed along grain boundary phases R, which are lower in strength than the main phases S, so that split pieces are formed in a state in which the main phases S adjacent to the split line L2 maintain their original sizes and their outer peripheries are protected by grain boundary phases R. Thus, in comparison with the divided magnets obtained by mechanical cutting, the split magnets are high in both the residual magnetic flux density and the cohesive force.

[Experiments Comparing the Variation of Magnet Weight per Magnetic Pole between Motor Equipped with Related-Art Rotor (Comparative Example) and Motor Equipped with Rotor of the Invention (Example), Experiments Comparing the Degree of Imbalance of Rotor Therebetween, Experiments Comparing the Degree of Variation of Motor Torque Therebetween, And Results of the Experiments]

The present inventors experimentally made IPM motors each equipped with a rotor having eight magnetic poles each of which included two permanent magnets. Among them, one motor was equipped with a rotor having a related-art structure in which permanent magnets purchased as separate units were inserted and fixed in the slots of each magnetic pole (Comparative Example), and another motor was equipped with a rotor having a structure in accordance with the invention as shown in FIG. 1 (Example).

Firstly, magnets having a size suitable for the magnetic poles were made, and the weights of the magnets were measured. Results are shown in comparison between Comparative Example and Example in FIG. 3. Incidentally, in FIG. 3, a measured value of the variation of the magnet weight of Comparative Example is defined as 100, and a measured value of the variation of the magnet weight of Example is shown by a percentage to the measured variation of the magnet weigh of Comparative Example.

Figure 4:
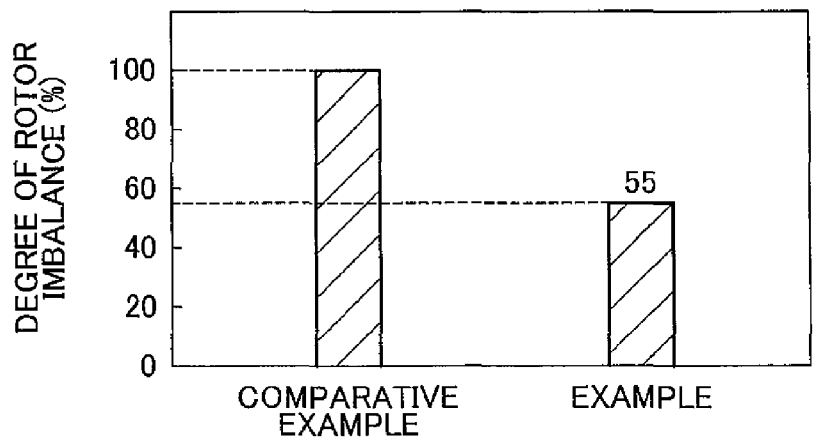
FIG. 4 is a graph showing results of an experiment in which the motor equipped with the related-art rotor (Comparative Example) and the motor equipped with the rotor in accordance with the invention (Example) are compared in the degree of imbalance of the rotor.
Figure 5:
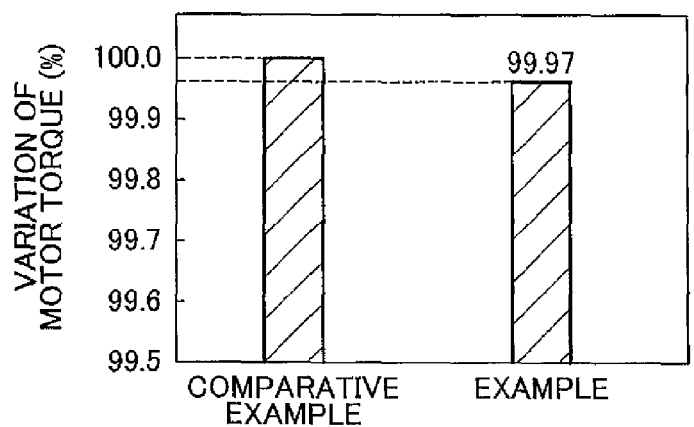
FIG. 5 is a graph showing results of an experiment in which the motor equipped with the related-art rotor (Comparative Example) and the motor equipped with the rotor in accordance with the invention (Example) are compared in the degree of variation of the motor torque.

Variations of the motor balances (unit: g·cm) and the motor torque having certain widths from the actual tolerances of the dimensions and weights of component parts of the rotors were calculated, and results of the calculation are shown in comparison between the two motors are shown in FIGS. 4 and 5. Incidentally, the calculated degrees of variation of the imbalance of the rotor and of the motor torque of Comparative Example are defined as 100, and the calculated degrees of variation of the imbalance of the rotor and of the motor torque of Example are shown by percentages thereto.

Figure 3:
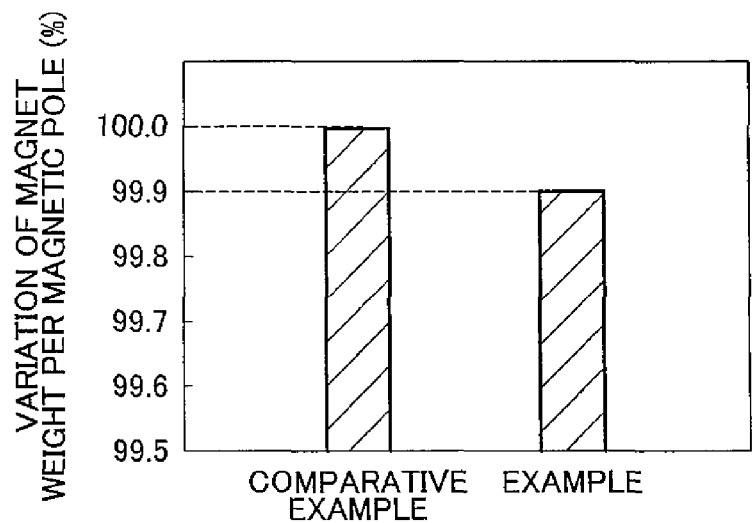
FIG. 3 is a graph showing results of an experiment in which a motor equipped with a related-art rotor (Comparative Example) and a motor equipped with a rotor in accordance with the invention (Example) are compared in the variation of the magnet weight per magnetic pole.

As shown in FIG. 3, it has been demonstrated that under the condition in the number of magnetic poles in this experiment, the employment of the split magnets (Example) reduces the degree of variation of the magnet weight per magnetic pole by about 0.1%. With regard to the results of the comparison in the rotor imbalance shown in FIG. 4, it has been demonstrated that Example can be expected to reduce the rotor imbalance by as much as 40% or more relative to Comparative Example, although the reduction effect can be considered to be lower than the aforementioned percentage figure of the degree of variation. This leads to the variation of the motor torque being able to be reduced by 0.03% as shown in FIG. 5.

From these experimental results, it has been demonstrated that the effect achieved on the rotor performance when the motor is driven can be sufficiently brought about. In addition to the effect of improving the rotor performance, it is possible to achieve the aforementioned other effects, that is, to reduce the production costs of rotors and of motors including the purchase of permanent magnets, and to abolish time-consuming operations such as an operation of performing an adjustment process on end plates in order to adjust the rotor imbalance resulting from the weight error of the permanent magnets of each magnetic pole, and therefore to reduce the production time of motors while satisfying desired quality requirements.

While what are considered to be the preferred embodiments of the invention have been described above with reference to the drawings, the concrete constructions of the invention are not limited to the foregoing embodiments. On the contrary, design changes and modifications, etc., are included in the invention, without departing from the gist of the invention.

For example, in a configuration in which one magnetic pole is formed by two permanent magnets, it is also permissible to adopt a configuration in which all the permanent magnets provided in two magnetic poles (i.e., four permanent magnets) that are located symmetrically about a rotation center of the rotor core are formed by splitting one large-size parent permanent magnet into four pieces.

In the production method of the invention, it is also permissible to adopt a construction in which the permanent magnets provided in two magnetic poles (i.e., four permanent magnets) that are located symmetrically about a rotation center of the rotor core are formed by splitting one large-size parent permanent magnet into four pieces, and the four split pieces are inserted and fixed in four magnet slots formed in the symmetrically located two magnetic poles.

The number of permanent magnets contained in each magnetic pole is not limited to two; for example, it is possible to adopt a construction in which each magnetic pole contains three permanent magnets that are obtained by splitting one parent permanent magnet into three split pieces.

Besides, for example, in the case where the number of permanent magnets contained in a magnetic pole is three, the six permanent magnets contained in two magnetic poles located symmetrically about the rotation center of the rotor may be six split magnet pieces obtained by splitting one parent permanent magnet that is larger than the permanent magnets contained in the magnetic poles.

What is claimed is:

1. An IPM motor rotor comprising
a rotor core including a plurality of magnetic poles, each magnetic pole having two permanent magnets, wherein
the two permanent magnets provided in each magnetic pole are a first split piece and a second split piece obtained by splitting one parent permanent magnet into the two permanent magnets,
wherein a split line, obtained by splitting the one parent permanent magnet, is formed along grain boundary phases of the one parent permanent magnet.

2. The IPM motor rotor according to claim 1, wherein
the parent permanent magnet has a cut, and
the split pieces are obtained by splitting the parent permanent magnet along the cut.

3. An IPM motor rotor comprising:
a rotor core including a plurality of magnetic poles, each magnetic pole having two permanent magnets, wherein
at least four of the permanent magnets respectively provided in two of the magnetic poles located symmetrically about a rotation center of the rotor are a first split piece, a second split piece, a third split piece and a fourth split piece obtained by splitting one parent permanent magnet into the four permanent magnets,
wherein split lines, obtained by splitting the one parent permanent magnet, is formed along grain boundary phases of the one parent permanent magnet.

4. The IPM motor rotor according to claim 3, wherein
the parent permanent magnet has a cut, and
the split pieces are obtained by splitting the parent permanent magnet along the cut.

* * * * *